United States Patent
Yamamoto et al.

[11] Patent Number: 5,288,826
[45] Date of Patent: Feb. 22, 1994

[54] POLYMER, SURFACE MODIFIER FOR INORGANIC MATERIALS AND MODIFIED PRODUCTS THEREOF

[75] Inventors: Masaharu Yamamoto, Suita; Masatoshi Ohata, Sakai, both of Japan

[73] Assignee: Nippon Paint Co., Ltd., Osaka, Japan

[21] Appl. No.: 944,176

[22] Filed: Sep. 11, 1992

[30] Foreign Application Priority Data

Sep. 13, 1991 [JP] Japan .................. 3-234463

[51] Int. Cl.$^5$ .............................................. C08F 30/08
[52] U.S. Cl. ..................................................... 526/279
[58] Field of Search .......................................... 526/279

[56] References Cited

U.S. PATENT DOCUMENTS 4,716,091 12/1987 Yoshihara et al. ..................... 430/67

FOREIGN PATENT DOCUMENTS

| | | | |
|---|---|---|---|
| 95236 | 8/1981 | Japan . | |
| 59-53509 | 3/1984 | Japan | 526/279 |
| 59-53516 | 3/1984 | Japan | 526/279 |
| 201917 | 9/1987 | Japan . | |

OTHER PUBLICATIONS

Chemical Abstracts, vol. 117, No. 8, Aug. 24, 1992, Ohata, et al., "Graftings of end-alkoxysilylated polystrenes onto inorganic pigments . . .".
Database WPIL, Section CH, Week 8836, Nov. 2, 1988, Derwent Publications, "Documentation Abstracts Journal"; Abstract—JP-A-63-112-633 Abstract.
Database WPIL, Section CH, Week 8741, Dec. 9, 1987, Derwent Publications, "Documentation Abstracts Journal"; Abstract—JP-A-62-201-917 Abstract.

*Primary Examiner*—Joseph L. Schofer
*Assistant Examiner*—N. Sarofim
*Attorney, Agent, or Firm*—Townsend & Banta

[57] ABSTRACT

Disclosed is a polymer prepared from an $\alpha,\beta$-ethylenic unsaturated compound, characterized by having a structure represented by the following general formula (1):

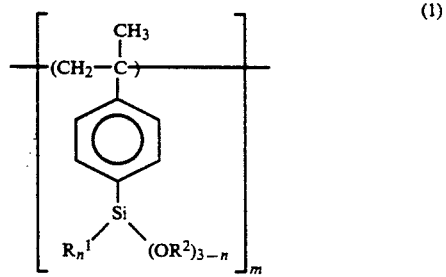

(where, $R^1$ and $R^2$, which are the same or different, a C1-C4 alkyl group, m is an integer of 1-10 and n is 0, 1 or 2) in the molecule.

9 Claims, 3 Drawing Sheets

POLYMER, SURFACE MODIFIER FOR INORGANIC MATERIALS AND MODIFIED PRODUCTS THEREOF

BACKGROUND OF THE INVENTION

1. Field of the Invention

The present invention relates to a polymer having highly controlled molecular structure, a surface modifier for inorganic materials using the polymer, and a modified inorganic material using the modifier. In more detail, the present invention relates to a polymer having a hydrolyzable silanol group at the terminal and/or central part in the molecule. In addition, the present invention also relates to a surface modifier which affords desired dispersibility when applied for modifying pigment and other inorganic fine particles, and which affords such functions as adhesive, wetting and water-repellent properties when applied for treating the surface of the inorganic material. The present invention further relates to an inorganic material whose surface is modified by the surface modifier.

2. Description of the Prior Art

Hitherto in order to improve affinity and adhesivity between and an organic material and an inorganic material, surfactants and coupling agents (e.g. chromium-type, silane-type, titanium-type) have been utilized. Among them, the silane coupling agents have been most extensively used because of high performance after modification and their cheap cost [E. P. Plueddemann: "Silane Coupling Agents," Plenum, N.Y., 1982].

Japanese Kokai Publication No. 95326/1981 discloses a pigment-dispersing liquid which is a copolymer having at least one alkoxysilyl group. In Japanese Kokai Publication No. 20197/1987, a block copolymer of p-alkoxysilylstyrene and styrene is disclosed.

The pigment dispersing liquid as described in the above Japanese Kokai Publication No. 95326/1981, however, gives rise to a problem of secondary aggregation of the pigment after the treatment, because the alkoxysilyl groups are present in unspecified position of the polymer molecule and tend to cause gelation between the resins and bridging among pigment particles. The block copolymer, as described in the above Japanese Kokai Publication No. 201917/1987, also has a problem in production. It is difficult that p-alkoxysilylstyrene is introduced in a specific position of the polymer molecule in a controlled amount, because the p-alkoxysilylstyrene have an extremely large polymerization rate. In addition, the silane coupling agents, have a relatively low molecular weight and therefore do not afford sufficient wettability or dispersibility as surface modifiers.

SUMMARY OF THE INVENTION

In view of the above discussion, the present inventors have made extensive studies to find that a polymer is able to be prepared, in which a repeating unit containing continuously 1 to 10 of an alkoxysilyl-α-methylstyrene derivative is selectively introduced into the terminal or central part of the main chain, by using an alkoxysilyl-α-methylstyrene derivative which is low in polymerization speed. In addition, the present inventors surprisingly have found that, when the above polymer used for modifying pigment and other inorganic materials, the treated inorganic material which is dispersed uniformly and readily in organic medium is obtained. Furthermore, an inorganic material, to which such a water-repellent property as showing a surface tension similar in degree to that of the polymer had been afforded, was obtained and then the present invention was completed.

Thus, the present invention provides a polymer which is prepared from an α,β-ethylenic unsaturated compound and has a structure represented by the following formula (1) in the molecule;

(where, $R^1$ and $R^2$, which are the same or different, represent a $C_1$–$C_4$ alkyl group, m is an integer of 1 to 10 and n is 0, 1 or 2).

The present invention also provides a surface modifier for inorganic materials by using the above polymer. In addition, the present invention provides inorganic materials modified by the above surface modifier.

DETAILED DESCRIPTION OF THE INVENTION

The polymer of the present invention is prepared from an α,β-ethylenic unsaturated compound. The α,β-ethylenic unsaturated compound may be represented generally by a formula: $CH_2=CXR$ (where, X stands for an unsubstituted or substituted phenyl group, an alkenyl group having 2 to 4 carbon atoms or a —COO—Q in which Q is an alkyl group having 1 to 7 carbon atoms and R stands for a hydrogen atom or a methyl group). Typical examples of the compounds are (meth)acrylate, such as methyl (meth)acrylate, ethyl (meth)acrylate, n-butyl (meth)acrylate, tert-butyl (meth)acrylate, propyl (meth)acrylate, isopropyl (meth)acrylate and phenyl (meth)acrylate; styrene derivatives, such as styrene, p- or m-methylstyrene, α-methylstyrene, p- or m-chlorostyrene, p- or m-bromostyrene and N,N-dimethylaminomethylstyrene; diene derivatives, such as butadiene and isoprene; and mixtures thereof. It is also known that anionic polymerization can proceed heterocyclic monomers (e.g. ethylene oxide, propylene oxide, ethylene sulfide, hexamethylcyclotrisiloxane, ε-caprolactone) other than the above mentioned α,β-ethylenic unsaturated compound, but the present invention does not employ the heterocyclic compounds.

The polymer of the present invention is characterized by having the structure represented by the above general formula (1) in the molecule. The silyl compounds to be used for introducing the structure (1) into the molecule may include an alkoxysilyl-α-methylstyrene derivative (called simply as silylstyrene derivative sometime hereafter) which is represented by the following formula:

(where, $R^1$, $R^2$, m and n mean as described before). Examples of the silylstyrene derivatives are trimethoxysilyl-α-methylstyrene, dimethylmethoxysilyl-α-methylstyrene, methyldimethoxysilyl-α-methylstyrene, triethoxysilyl-α-methylstyrene, dimethylethoxysilyl-α-methylstyrene, methyldiethoxysilyl-α-methylstyrene, dimethylisopropoxysilyl-α-methylstyrene, methyldiisopropoxysilyl-α-methylstyrene, dimethylbutoxysilyl-α-methylstyrene and others, and one or more of these compounds may be used.

A polymer of the present invention has the structure represented by the above general formula (1) in its molecule. In the general formula (1), more than 10 of m tends to cause deposition of the surface modifier in the course of modification of an inorganic material by the surface modifier to be described later and aggregation in the modified inorganic material. A preferable polymer has the structure (1) at the terminal or central part of the molecule. The "central part of the molecule" signifies all parts of the molecule other than the terminal part, and it is particularly preferable that high molecular weight chains having molecular weights of from about 3,000 to about 30,000 are independently bonded at both ends of the structure (1).

For the preparation of the polymer of the present invention having such a highly controlled chemical structure as described above, anionic polymerization is suitable and living anionic polymerization is particularly suitable. In more detail, for the preparation of the polymer of the present invention, which has the above structure (1) at the terminal of the molecule, for example, the above α,β-ethylenic unsaturated compound is polymerized by using a monofunctional polymerization initiator and then the above alkloxysilyl-α-methylstryrene derivative is allowed to react with the living end of the polymer. In an alternative method, the monofunctional polymerization initiator is reacted with the alkoxysilyl-α-methylstyrene and then onto the living terminals of the reaction product is polymerized the α,β-ethylenic unsaturated compound. For the preparation of the polymer of the present invention, which has the above structure (1) at the central part of molecule, for example, the alkoxysilyl-α-methylstyrene derivative is reacted with a bifunctional polymerization initiator and then onto the living end of the reaction product is polymerized an α,β-ethylenic unsaturated compound. In an alternative process, after the α,β-ethylenic unsaturated compound is polymerized to the monofunctional polymerization initiator, the above alkoxysilyl-α-methylstyrene derivative is reacted to the living terminals of the product and then the α,β-ethylenic unsaturated compound is polymerized thereto.

The monofunctional anionic polymerization initiator is known to the art, for example n-butyl lithium, sec-butyl lithium, tert-butyl lithium, cumyl potassium, cumyl cesium, 1,1-diphenylhexyl lithium, flourenyl lithium and others. The bifunctional anionic polymerization initiator is also known to the art, for example those having radical anions, such as naphthalene lithium, naphthalene sodium, naphthalene potassium and α-methylstyrene tetramer disodium. In case where the alkoxysilyl-α-methylstyrene derivative is reacted with a monofunctional polymerization initiator and then an α,β-ethylenic unsaturated compound is polymerized, the above monofunctional polymerization initiators may arise a side reaction with the alkoxy group of the alkoxysilyl-α-methylstyrene derivative, and so it is advised to allow the monofunctional initiator to react previously with a small amount of a bulky compound such as α-methylstyrene to inhibit the side reaction. There is no limit on the amount of the bulky compound to be added, but it is general to use 1 to 5 molar equivalents to the monofunctional initiator.

The conditions of the polymerization of the α,β-ethylenic unsaturated compound and the alkoxysilyl-α-methylstyrene derivative may be selected adequately, and it is general, for example, to carry out the polymerization at $-80°$ C. to $100°$ C. in an atmosphere of an inert gas or under a reduced pressure (preferably in high vacuum), in a solvent inert to the polymerization reaction for 1 minute to 72 hours. Examples of the solvent that may be used are an aromatic hydrocarbon, such as benzene, toluene, xylene and ethylbenzene; an ether, such as tetrahydrofuran, diethylether and dioxane; and an alicyclic hydrocarbon, such as cyclohexane, and one or more solvents may be used. There is no limit in regard to the polymerization concentration, but it is preferable to conduct, for example, in the range of 1 to 20 wt %.

Upon polymerization reaction, an additive may be added in order to control the activity of the growing terminal. Examples of the additives are tertiary amines, such as tetramethylethylenediamine, dipiperidinoethane, triethylamine and N-methylpyrrolidine; crown ethers, such as 12-crown-4 and 15-crown-5; salts having ions identical with the counter cation of the growing terminal, such as lithium chloride, sodium chloride, potassium chloride and cesium chloride; and mixtures thereof. No limit exists on the amount of these compounds to be added, but it is general to add 1 to 10-fold moles against the growing terminal. When methacrylic esters are polymerized, it is advised to allow it to react with a vinylidene compound having a bulky substituting group (e.g. 1,1-diphenylethylene) for the purpose of inhibiting side reaction of the living terminal to the carbonyl group of methacrylic esters. The amount of the vinylidene compound to be added has no limitation in particular but it is general to add 1 to 1.2 molar equivalents against the living terminal. After polymerization has been completed, the reaction may be terminated, for example, by inactivating the living terminal in contact with a proton donor or an alkylsilyl halide. Examples of the proton donor are alcohols, such as methanol, ethanol and phenol; and water. An example of alkylsilyl halide is trimethylsilyl chloride. One or more of these compounds may be used.

The polymers of the present invention which are obtained in the way described above have preferably a number average molecular weight of 1,000 to 1,000,000, and particularly preferably 5,000 to 100,000. When the number average molecular weight is outside of this range, it tends to cause difficulty in controlling the polymerization temperature and purification of the polymer from unreacted monomers and solvent, and furthermore it is hard to expect sufficient surface modifying effects.

It is possible to prepare a surface modifier for inorganic materials by employing the polymer of the present invention. One or more kinds of the polymers may be used. For the surface modifier of the present invention, an acidic or basic catalyst is added for augmenting the surface modifying effects. Thus, the acidic or basic catalyst attacks the alkoxy group bound to Si to promote the decomposition, thus forming silanol groups. The silanol groups are then reacted or combined with the hydroxyl groups or adsorbed water present on the surface of an inorganic material to cover the surface of inorganic material solidly with the modifier, thus completing the modification of the surface of the inorganic material. The acidic or basic catalysts are not specifically limited, and examples of the acidic catalyst is sulfuric acid, hydrochloric acid, p-toluenesulfonic acid, n-butyl phosphate and the like. Examples of the basic catalyst are metal alkoxide, such as potassium methoxide, sodium methoxide; metal hydroxides, such as lithium hydroxide, sodium hydroxide and potassium hydroxide; tetrabutylammonium hydroxide; and mixtures thereof. The amount of the catalyst used is adequately selected, and it is preferable to use in the range of 0.01 to 1 wt % based on the amount of the surface modifier. A solvent may also be added as an additional additive to the surface modifier of the present invention. The solvent that may be used has no specific limitation, for example aromatic hydrocarbons, such as benzene, toluene, xylene, and ethylbenzen; ethers, such as tetrahydrofuran, diethyl ether and dioxane; alicyclic hydrocarbons, such as cyclohexane; and mixtures thereof.

The inorganic materials to be modified by the surface modifier of the present invention have no limitation in particular, and examples are such fine particles to be used for pigment and other products as carbon black, metallic aluminium powder, mica, titanium oxide, zinc white, antimony white, transparent iron oxide, black iron oxide, iron oxide red, red lead, cadmium yellow, zinc sulfide, lithopone, barium sulfate, lead sulfate, barium carbonate, lead white, alumina white and silica. The size of fine particles is not limited in particular, and it is good with 0.001 to 100 μm in diameter, for example. The shape of fine particles is not limited also, and it is good with spherical, plate, flake or undefined shape. The inorganic materials can be metallic materials, including metals, such as aluminium and iron; metal oxides of Zn, Pb, Ti, Sb, Cd, Fe, As, Mg, Al, Ba, Ca, Si, Co, Cr; and the like.

The amount to be used of a surface modifier of the present invention may be selected adequately, and it is good for example with 10 to 100 parts by weight based on 100 parts by weight of the inorganic material.

The modification procedure by using the surface modifier of the present invention may be performed, for example when the inorganic material is fine particles, preferably by dissolving or dispersing the surface modifier in a solvent and conducting the dispersing operation by a known method by mixing inorganic fine particles with the solution or dispersion; if desired the above-stated acidic or basic catalyst is added to the mixture. When an inorganic material is in plate or other shape, the modification may be performed by soaking the plate-shaped material into a solution of the surface modifier in a solvent. The conditions of treatment for modification may be selected adequately, and examples are treating temperature: 30° to 110° C. and treating time: 1 minute to 24 hours. Any known dispersing apparatus may be used in the modification treatment, and examples are roll mill, colloid mill, ball mill, sand grinder and attriter. When such ordinary after-treatments as drying and washing are applied after the modification procedures, a modified inorganic material which has been modified by the surface modifier of the present invention is obtained.

Below is given an explanation on how the molecular structure of the polymer of the present invention is controlled so extensively on a polymer having the above structure (1) at the terminal part of the molecule as an example.

When the silylstyrene derivative (M) is reacted with a living polymer ($L_p-$) to form a polymer [$L_p-(M)_m-H$], the polymerization reaction is shown as follow:

(where, $k_i$ is a rate constant of the addition of M to $L_p-$ and $k_p$ is that of propagation of M; m signifies as described before.) According to this scheme, for the linking of all of $L_p-$ species with $(M)_m$, $L_p-$ must firstly react with M and then polymerization of M must follow. If prior to the reaction of $L_p-$ and M polymerization of M took place, then the products formed in the reaction system would have been $L_p-$ and $(M)_{m-1}$-M-, which however, will not react with each other, because since these are both anions. In other words, M must attach to $L_p-$ faster than to another M (namely single polymerization in the latter case). Thus, it must be satisfied: rate constant of addition $k_i >$ that of propagation $k_p$ (preferably $k_i >> k_p$). Accordingly, in the present invention for the satisfaction of the above relation, an M with small enough $k_p$ is employed. With regard to styrene itself, it has been known that introduction of a methyl group to the α-position of vinyl group greatly lower $k_p$ [$k_p$(styrene)=550l/mol•sec, $k_p$(α-methylstyrene)=2.5l/mol•sec]. In the present invention, therefore, a monomer into which a methyl group has been introduced to the α-position of vinyl group, like alkoxysilyl-α-methylstyrene, is preferable as M, for lowering $k_p$ sufficiently.

On the other hand, the above-mentioned invention described in Japanese Kokai Publication No. 20197/1987 employs as a monomer p-triethoxysilylstyrene. Since such a monomer has no methyl group at the α-position, $k_p$ is greatly large (actually a polymerization degree of 39 to 164 is reached in 4 minutes). Accordingly such a monomer cannot satisfy the relation of $k_i > k_p$, and as a result there can occur formation of a polymer in which $(M)_m$ is not linked. Such a polymer contains no alkoxysilyl group and will show decreased adhesivity between the surface modifier and the inorganic material, and as a result the modifier may be peeled off the surface of inorganic material giving disappearance of the modification effect.

The surface modifier of the present invention can be prepared according to desired molecular architecture and synthesis, and so can be made to possess desired molecular structure and molecular weight, and since it has a narrow molecular weight distribution, it may be employed profitably as a dispersing agent for pigment and other fine particles and as a regulator of surface tension in inorganic materials. When the modified materials are used in solvent-borne paint, powder paint and water borne paint, they show excellent dispersibility and the coated film obtained shows excellent weather resistance and water resistance.

BRIEF DESCRIPTION OF THE DRAWINGS

These and other objects and features of the present invention will become apparent from the following description taken in conjunction with the preferred embodiment thereof with reference to the accompanying drawings, in which.

EXAMPLES

The present invention is explained in more detail by the following Examples, but the invention is not limited by them at all.

PREPARATION OF POLYMER

Example 1

Figure 1:
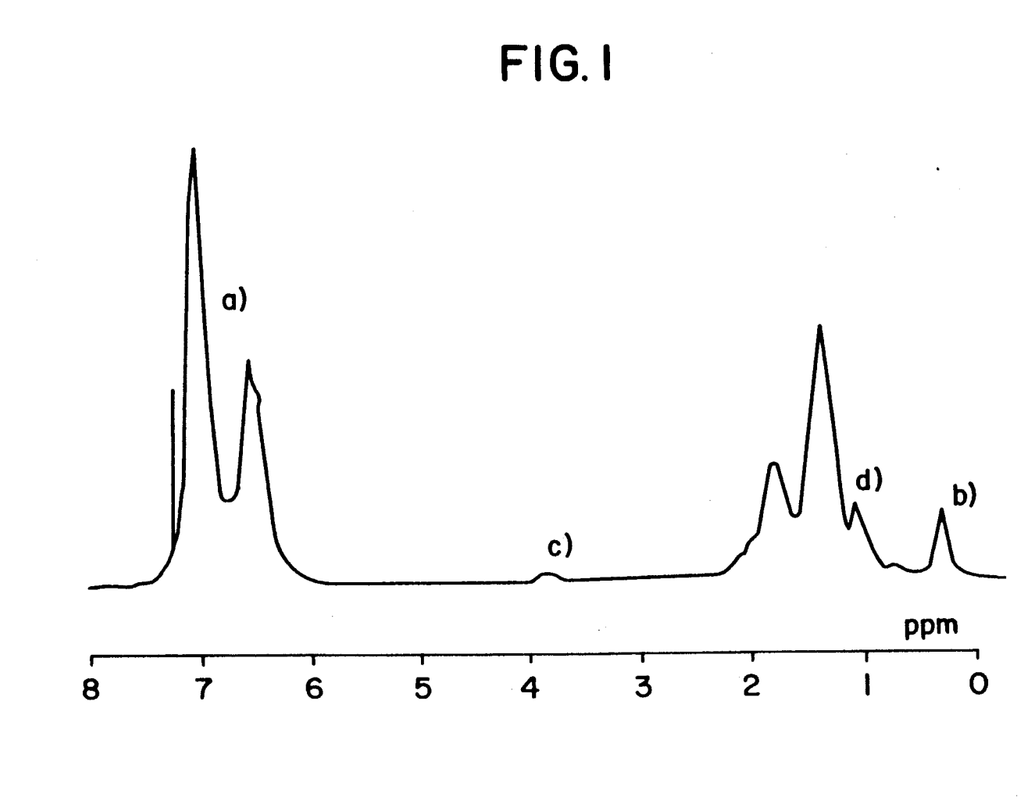
FIG. 1 is a view showing the $^1$H-NMR spectrum of the polymer described in Example 1, which is represented by the following formula.
Figure 2:
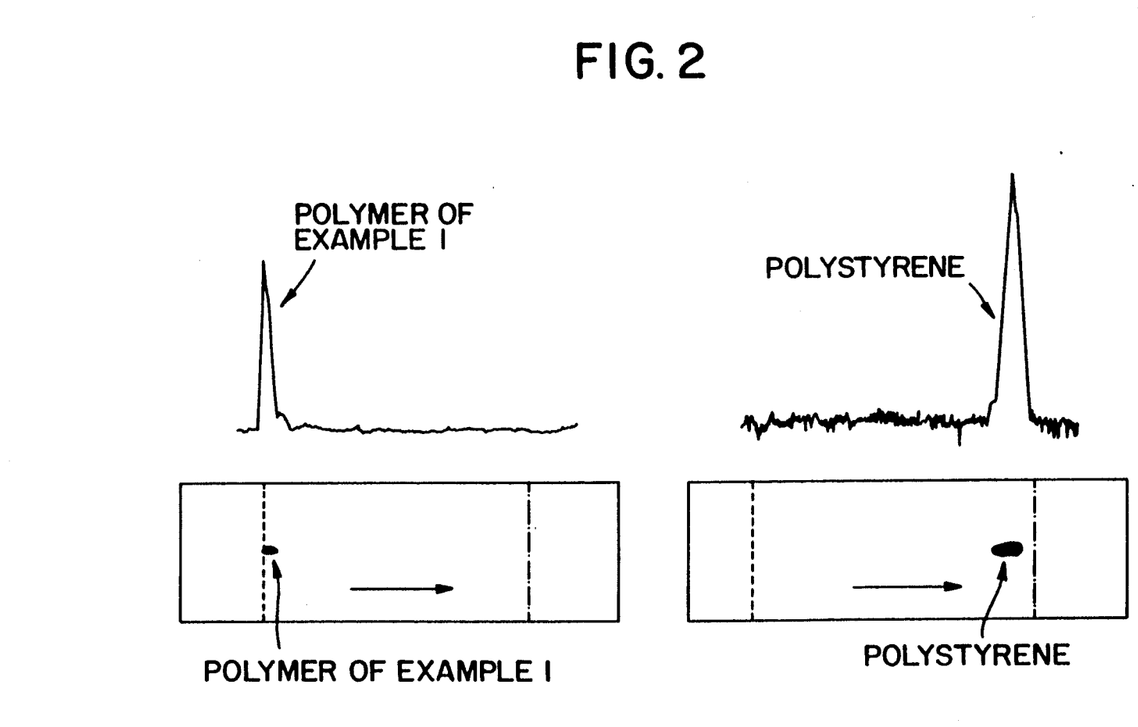
FIG. 2 is a view showing thin-layer chromatograms (lower part) of the polymer of Example 1 and polystyrene in a solvent system of benzene/hexane (80/20 wt %) and curves obtained by a chromato-scanner (upper part)

The polymerization was conducted in a high vacuum by the breakseal method (same in Examples 2 and 3 too). Firstly, a tetrahydrofuran (THF) solution of α-methylstyrene tetramer sodium was added into a polymerization reactor rinse the inside of the reactor and removed. Then, a hexane solution (17.3 ml) of n-butyl lithium (2.1 mmol) and tetrahydrofuran (212 ml) were added to the reactor and cooled to −78° C. A tetrahydrofuran solution (92 ml) of styrene (210 mmol) was added and the polymerization was started. After agitation for 60 minutes, a tetrahydrofuran solution (39 ml) of p-isopropoxydimethylsilyl-α-methylstyrene (16.0 mmol) was added thereto. After agitation for 30 minutes more, methanol (2 ml) was added to stop the polymerization. The reaction mixture was added to a large volume of methanol to separate the reaction product, which was dried, purified by reprecipitation from methanol and freeze-dried by using 200 ml of benzene. The polymer was obtained in an amount of 23.8 g (yield, 93%), and number average molecular weight estimated by gel permeation chromatography (Mn)=$1.4 \times 10^4$, molecular weight distribution (Mw/Mn)=1.26. The number of isopropoxysilyl groups contained in one molecule of the polymer, as estimated by $^1$H-NMR, was 5.9 (see FIG. 1). The polymer was also analyzed by means of thin-layer chromatography and chromatoscanner by using a solvent system of benzene/hexane (80/20 wt %) (see FIG. 2). The results indicated that all of the polystyrene terminals contained the isopropoxysilyl group.

Example 2

After rinsing the inside of a polymerization reactor of a reactor in the manner similar as described in Example 1, a hexane solution (6.9 ml) of n-butyl lithium (2.4 mmol) and tetrahydrofuran (480 ml) were added to the reactor and cooled to −78° C. Then a tetrahydrofuran solution (113 ml) of styrene (342 mmol) was added and polymerization was initiated. After agitation for 60 minutes, a tetrahydrofuran solution (28 ml) of p-triethoxysilyl-α-methylstyrene (16.6 mmol) was added. Then the mixture was agitated for 30 minutes more and methanol (2 ml) was added to stop the polymerization. A polymer was obtained after the procedures similar as described in Example 1 in an amount of 37.4 g (yield 93%) and showed Mn=$1.7 \times 10^4$ and Mw/Mn=1.27. The number of triethoxysilyl groups as estimated by the method described in Example 1 was 3.3 indicating that triethoxysilyl group was contained at all polystyrene terminals.

Example 3

After rinsing the inside of a reactor by the method similar as described in Example 1, a cyclohexane solution (7.9 ml) of sec-butyl lithium (2.2 mmol) and toluene (165 ml) were added to the reactor, and a toluene solution (100 ml) of styrene (219 mmol) was added to start polymerization at 30° C. After agitation for 120 minutes tetrahydrofuran (97 ml) was added. Then the mixture was cooled to −78° C. and a toluene solution (10 ml) of p-isopropoxydimethylsilyl-α-methylstyrene (10.7 mmol) was added. The mixture was agitated for 30 minutes more and methanol (2 ml) was added to finish polymerization. After applying similar procedures as described in Example 1, 24.3 g (yield 96%) of a polymer was obtained, which showed Mn=$1.1 \times 10^4$ and Mw/Mn=1.03. The number of isopropoxydimethylsilyl groups obtained by the method similar as described in Example 1 was 2.7 confirming that all terminals of the polystyrene contained isopropoxydimethylsilyl group.

Example 4

After rinsing the inside of a reactor by the method similar as described in Example 1, a hexane solution (5.2 ml) of n-butyl lithium (3.5 mmol) and tetrahydrofuran (440 ml) were added to the reactor. Then a tetrahydrofuran solution of α-methylstyrene (14.4 mmol) was added and agitated for 15 minutes at 30° C. The mixture was then cooled to −78° C. and a tetrahydrofuran solution (20 ml) of p-triethoxysilyl-α-methylstyrene (15 mmol) was added. After agitation for 60 minutes, a tetrahydrofuran solution (7.2 ml) of diphenylethylene (4.2 mmol) was added, and after another 60 minutes' agitation, a tetrahydrofuran solution (122 ml) of tert-butyl methacrylate (290 mmol) was added to initiate polymerization. The mixture was agitated for 60 minutes and then methanol (2 ml) was added to stop polymerization. A polymer was obtained in an amount of 45.0 g (yield 94%) after applying procedures similar as described in Example 1; $Mn=1.5\times10^4$ and $Mw/Mn=1.37$. The number of triethoxysilyl groups estimated by the method similar as described in Example 1 was 2.2 and it was confirmed that all terminals of poly-t-butyl-methacrylate contained triethoxysilyl group.

EXAMPLE 5

After rinsing the inside of a reactor by the method described in Example 1, a tetrahydrofuran solution (7.2 ml) of α-methylstyrene tetramer disodium (initial concentration: 1.4 mmol) and tetrahydrofuran (420 ml) were added to the reactor. After cooling the mixture to $-78°$ C., a tetrahydrofuran solution (12 ml) of p-tert-butoxydimethylsilyl-α-methylstyrene (9.5 mmol) was added to allow the reaction to proceed for 60 minutes. Then a tetrahydrofuran solution (10 ml) of diphenylethylene (1.7 mmol) was added and, after agitation for 15 minutes, a tetrahydrofuran solution (115 ml) of methyl methacrylate (180 mmol) was added to initiate polymerization. Agitation was continued for 60 minutes and then methanol (3 ml) was added to stop polymerization. A polymer was obtained after applying similar procedures as described in Example 1 in an amount of 19.1 g (yield 92%); $Mn (GPC)=2.8\times10^4$ and $Mw/Mn=1.42$. The number of tert-butoxysilyl groups estimated by the method as described in Example 1 was 5.9 and it was confirmed that at the central part of the main chain of all polymethylmethacrylate the tert-butoxysilyl group resided.

Comparative Example 1

Into 10 g of toluene containing 0.5 g of azobisisobutyronitrile (AIBN) were added 95 g of styrene and 5 g of γ-methacryloxypropyltriethoxysilane and the mixture was agitated for 7.5 hours at 80° C. under nitrogen stream. Then procedures similar as described in Example 1 were applied. A polymer was obtained in an amount of 91 g (yield 91%) and $Mn=1.8\times10^4$, $Mw/Mn=2.57$. The number of triethoxysilyl groups estimated by the method described in Example 1 was 4.9.

Preparation of modified inorganic materials

Example 6

Figure 3:
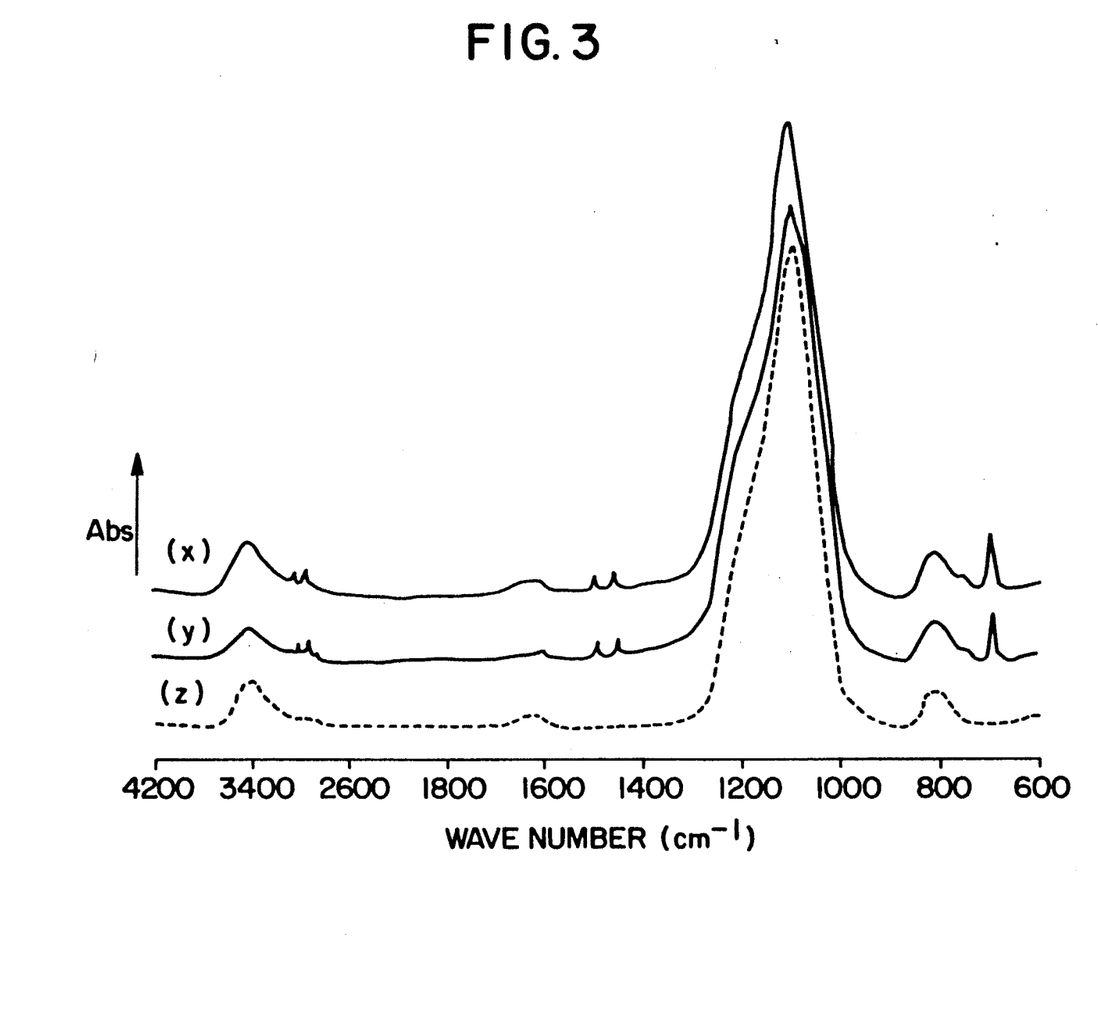
FIG. 3 is a view showing the infrared absorption spectrum of the silica modified by the procedures described in Example 6 (x), that of the silica which was mixed just before estimation with polystyrene in the amount identical to the increased weight of the silica modified as in Example 6 (y) and that of untreated silica (z).

A toluene solution (20 ml) of the polymer obtained in Example 1 (2.0 g) and a dispersed solution in toluene (3.0 g, 60 ml) of Aerosil 130 (average primary particle size: 20 nm), a product of Japan Aerosil Inc., were admixed and agitated, and then n-butyl phosphate (0.20 g) was added. After agitation for 2 hours, solid content was collected by centrifugation and dried in vacuo at 60° C. for 3 hours. This was again dispersed in toluene, agitated for 2 hours and solid content was collected before it was dried in vacuo at 60° C. for 3 hours. These procedures were repeated until the weight of the dried solid matter did not show change. Increase of weight in the modified silica is shown in Table 4. That polystyrene reacts on the surface of the modified silica is confirmed by estimating its infrared absorption spectrum, which is shown in FIG. 3. This modified silica was dispersed in toluene and its means particle size was estimated by the light scattering method for evaluation of its stability to organic dispersing medium. The result is shown in Table 1. On the other hand the modified silica was dispersed in a toluene solution of polystyrene and submitted to estimation by using a grind gage for evaluation of its dispersibility in a binder solution. The result is shown in Table 2.

EXAMPLE 7

Modification of Aerosil 130 of Japan Aerosil Inc. was carried out by the procedures similar as described in Example 6 except that the polymer obtained in Example 2 was used in place of the one obtain in Example 1. Increase of weight of the modified silica after the modification is shown in Table 4. That polystyrene reacts on the surface was confirmed by estimating infrared spectrum similarly as in Example 6. Evaluations of dispersibility of the modified silica in toluene and in a toluene solution of polystyrene were carried out similarly as in Example 6 also. The results of the evaluation are shown in Tables 1 and 2.

EXAMPLE 8

Modification of Aerosil 130 of Japan Aerosil Inc. was carried out in the similar way as described in Example 6 except that the polymer described in Example 3 was used in place of that described in Example 1, and its dispersibilisty in toluene and in a toluene solution of polystyrene was evaluated. The results are shown in Tables 1 and 2.

EXAMPLE 9

Modification was conducted in the way similar as described in Example 6 except that the polymer described in Example 2 was used in place of that described in Example 1, aluminium oxide-C (mean primary particle size: 15 nm) of Japan Aerosil Inc. was used in place of Aerosil 130 of the same company and an identical amount of tetrabutylammonium hydroxide was used in place of n-butyl phosphate. Increase of weight of the modified aluminium oxide-C after modification is shown in Table 4. That polystyrene reacts on the surface was confirmed by estimating infrared spectrum in the way similar as described in Example 6. Also similarly as in Example 6 dispersibility of the modified Aluminium oxide-C in toluene was evaluated. The result is shown in Table 1.

EXAMPLE 10

An aluminium plate was soaked in a tetrahydrofuran solution (62 ml) of the polymer (1.6 g) described in Example 2. After soaking for 30 minutes tetrabutylammonium hydroxide (0.17 g) was added dropwise. After 2.5 hours the aluminium plate was withdrawn and heated at 100° C. for 1.5 hours, and then soaked again in tetrahydrofuran (50 ml). After soaking for 2 hours the plate was withdrawn and dried in vacuo at 60° C. Surface tension of this modified plate was obtained by estimating the contact angle by using water and methyl iodide. The result is shown in Table 3.

EXAMPLE 11

Modification was carried out in the manner similar as described in Example 6 except that the polymer of Example 2 was used in place of that of Example 1, titanium dioxide P-25 of Japan Aerosil Inc. was used in place of Aerosil 130 of the same company and no such a catalyst as n-butyl phosphate was employed. Increase of weight of the modified titanium dioxide P-25 after the modification is shown in Table 4. That polystyrene reacts on the surface was confirmed by estimating infrared spectrum in the way similar as in Example 6.

EXAMPLE 12

Modification was carried out in the manner similar as described in Example 6 except that the polymer of Example 2 was used in place of that of Example 1, Mearlin Superfine 9120 V of Mearl Inc. was used as a mica in place of Aerosil 130 of Japan Aerosil Inc., and tetrabutylammonium hydroxide was used in place of n-butyl phosphate. Increase of weight of the modified mica after the modification is shown in Table 4, and that polystyrene reacts on the surface was confirmed in the way similar as described in Example 6 by estimating infrared spectrum.

EXAMPLE 13

Modification was carried out in the manner similar as described in Example 6 except that the polymer of Example 2 was used in place of that of Example 1, Exterior Mearlin Russet of Mearl Inc. was used as a mica in place of Aerosil 130 of Japan Aerosil Inc. and tetrabutylammonium hydroxide was used in place of n-butyl phosphate. Increase of weight of the modified mica after the modification is included in Table 4. That polystyrene reacts on the surface was confirmed by estimating infrared spectrum in the way similar as described in Example 6.

Comparative Example

Modification of Aerosil 130 of Japan Aerosil Inc. was carried out in the manner similar as described in Example 6 except using the polymer described in Comparative Example 1 in place of that of Example 1, and dispersibility of the modified silica in toluene and in a toluene solution of polystyrene was evaluated. Results of the evaluation are shown in Tables 1 and 2.

Comparative Example 3

Dispersibility of a commercially available silica which had been modified by octyltrimethoxysilane was evaluated by the method similar as described in Example 6. The result of evaluation of dispersibility in toluene is shown in Table 1.

Comparative Example 4

Dispersibility of a commercially available, unmodified silica was evaluated in a binder solution by the method similar as described in Example 6. The result is shown in Table 2.

Comparative Example 5

An aluminium plate was soaked in a methanol solution (60 ml) of phenyltrimethoxysilane (1.2 g). After 2.5 hours the aluminium plate was withdrawn and heated for 1.5 hours at 100° C. and then soaked again in methanol (50 ml). After 2 hour of soaking the plate was withdrawn and dried in vacuo at 60° C. This modified material was submitted to estimation of the angle of contact for obtaining the surface tension in the manner similar as in Example 9. The result is shown in Table 3.

TABLE 1

| | Example 6 | Example 7 | Example 8 | Example 9 | Comparative Example 2 | Comparative Example 3 |
|---|---|---|---|---|---|---|
| Modified substance | $SiO_2$ | $SiO_2$ | $SiO_2$ | $Al_2O_3$ | $SiO_2$ | $SiO_2$ |
| Modifier | Example 1 | Example 2 | Example 3 | Example 2 | Comparative Example 1 | None |
| Average particle size (nm) | 270 | 350 | 220 | 240 | 1100 | Could not be estimated. |

Note:
$SiO_2$ and $Al_2O_3$ in Table 1 are Aerosil 130 and aluminium oxide-C.

TABLE 2

| | Example 6 | Example 7 | Example 8 | Comparative Example 2 | Comparative Example 4 |
|---|---|---|---|---|---|
| Modifier | Example 1 | Example 2 | Example 3 | Comparative Example 1 | None |
| Reading of grind gage (μm) (JISK-5400) | <2.5 | <2.5 | <2.5 | 90 | >100 |

TABLE 3

| | Unmodified aluminium plate | Example 10 | Comparative Example 5 |
|---|---|---|---|
| Modifier | None | Example 2 | $PhSi(OMe)_3$ |
| Surface tension (dyn/cm) | 44.1 | 31.6 | 41.2 |

Note:
$PhSi(OMe)_3$ in Table 3 represents phenyltrimethoxysilane.

TABLE 4

| | Example 6 | Example 7 | Example 9 | Example 10 | Example 11 | Example 12 | Comparative Example 2 |
|---|---|---|---|---|---|---|---|
| Modified substance | $SiO_2$ | $SiO_2$ | $Al_2O_3$ | $TiO_2$ | Mica A | Mica B | $SiO_2$ |
| Specific surface area of modified substance (g/m²) | 130 | 130 | 100 | 50 | 7.9 | 6.0 | 130 |
| Increase of weight | 1.5 | 2.2 | 1.6 | 2.3 | 1.3 | 2.0 | 1.5 |

What is claimed is:

1. A polymer prepared from an α, β-ethylenic unsaturated compound having the chemical formula: $CH_2=CXR$ wherein X stands for an unsubstituted or substituted phenyl group or —COO—Q in which Q is an alkyl group having 1 to 7 carbon atoms and R stands for a hydrogen atom or a methyl group, said polymer comprising a structure having the following general formula (1):

(1)

where, $R^1$ and $R^2$, which are the same or different, a C1–C4 alkyl group, m is an integer of 1–10 and N is 0, 1 or 2 in the molecule.

2. The polymer according to claim 1 wherein said $\alpha,\beta$-ethylenic unsaturated compound is selected from the group consisting of (meth)acrylates, styrene derivatives, and mixtures thereof.

3. The polymer according to claim 1 wherein said formula (1) is introduced by an alkoxylsilyl-$\alpha$-methylstyrene derivative.

4. The polymer according to claim 3 wherein said alkoxysilyl-$\alpha$-methylstyrene is selected from the group consisting of trimethoxysilyl-$\alpha$-methylstyrene, dimethylmethoxysilyl-$\alpha$-methylstyrene, methyldimethoxysilyl-$\alpha$-methylstyrene, triethoxysilyl-$\alpha$-methylstyrene, dimethylethoxysilyl-$\alpha$-methylstyrene, methyldiethoxysilyl-$\alpha$-methylstyrene, dimethylisopropoxysilyl-$\alpha$-methylstyrene, methyldiisopropoxysilyl-$\alpha$-methylstyrene, dimethylbutoxysilyl-$\alpha$-methylstyrene and a mixture thereof.

5. The polymer according to claim 1 wherein said formula (1) is present at terminal or between the terminals.

6. The polymer according to claim 1 being prepared by anionic polymerization.

7. The polymer according to claim 1 having a number-average molecular weight of 1,000 to 1,000,000.

8. A surface modifier for inorganic materials comprising the polymer according to claim 1.

9. The surface modifier according to claim 8 wherein said inorganic materials are pigment or metal plate.

* * * * *